(12) United States Patent
Maier

(10) Patent No.: US 7,793,746 B2
(45) Date of Patent: Sep. 14, 2010

(54) NOISE-COMFORT FUNCTION FOR COOLING SYSTEMS WITH PROPORTIONAL VARIABLE SPEED FANS

(75) Inventor: Oliver Maier, Worms (DE)

(73) Assignee: GM Global Technology Operations, Inc., Detroit, MI (US)

( * ) Notice: Subject to any disclaimer, the term of this patent is extended or adjusted under 35 U.S.C. 154(b) by 627 days.

(21) Appl. No.: 11/684,249

(22) Filed: Mar. 9, 2007

(65) Prior Publication Data

US 2008/0217080 A1 Sep. 11, 2008

(51) Int. Cl.
    *B60K 11/06* (2006.01)
(52) U.S. Cl. .................. 180/68.3; 180/65.31; 903/908; 429/26
(58) Field of Classification Search ............... 180/68.3, 180/65.31; 903/908; 429/20, 26
    See application file for complete search history.

(56) References Cited

U.S. PATENT DOCUMENTS

| | | | |
|---|---|---|---|
| 6,186,254 B1 * | 2/2001 | Mufford et al. ............... 429/13 |
| 6,537,692 B1 * | 3/2003 | Horiguchi et al. ............. 429/22 |
| 6,595,433 B2 * | 7/2003 | Ap et al. .................. 237/12.3 B |
| 6,651,761 B1 * | 11/2003 | Hrovat et al. .................. 429/13 |
| 6,743,539 B2 * | 6/2004 | Clingerman et al. .......... 429/24 |
| 6,896,095 B2 | 5/2005 | Shah et al. |
| 6,939,631 B2 * | 9/2005 | Formanski et al. ............ 429/13 |
| 7,066,114 B1 * | 6/2006 | Hannesen et al. ......... 123/41.12 |
| 7,102,310 B2 * | 9/2006 | Ishishita ..................... 318/268 |
| 7,449,259 B2 * | 11/2008 | Zhu et al. ..................... 429/23 |
| 2006/0019136 A1 | 1/2006 | Alp et al. |
| 2007/0024244 A1 * | 2/2007 | Zhu et al. .................... 320/150 |
| 2007/0082245 A1 * | 4/2007 | Druenert ...................... 429/26 |
| 2008/0026269 A1 * | 1/2008 | Shurtleff et al. ............... 429/19 |
| 2008/0066476 A1 * | 3/2008 | Zhu et al. ..................... 62/133 |
| 2008/0118800 A1 * | 5/2008 | Devriendt et al. ............. 429/26 |
| 2008/0187803 A1 * | 8/2008 | Menon et al. ................. 429/24 |
| 2008/0202741 A1 * | 8/2008 | Lee et al. ..................... 165/288 |
| 2008/0251039 A1 * | 10/2008 | Stone et al. ............... 123/41.48 |
| 2009/0024252 A1 * | 1/2009 | Aridome et al. ............. 700/275 |
| 2009/0050082 A1 * | 2/2009 | Iwasaki ................... 123/41.49 |
| 2009/0095462 A1 * | 4/2009 | Ramaswamy ............... 165/288 |
| 2009/0120620 A1 * | 5/2009 | Abe et al. ............... 165/104.31 |
| 2009/0169928 A1 * | 7/2009 | Nishimura et al. ............ 429/13 |
| 2009/0266100 A1 * | 10/2009 | Viegas ......................... 62/335 |
| 2009/0293512 A1 * | 12/2009 | Miura .......................... 62/80 |

* cited by examiner

*Primary Examiner*—Jeffrey J Restifo
(74) *Attorney, Agent, or Firm*—Fraser Clemens Martin & Miller LLC; J. Douglas Miller

(57) ABSTRACT

A method for operating a cooling system for a fuel cell stack in a vehicle is provided. The method includes the steps of: determining a fan request for a variable speed fan disposed in the cooling system; employing a noise-comfort function to select a fan comfort request; and adjusting a speed of the variable speed fan in response to the fan request; wherein a noise emission by the variable speed fan is militated against. A cooling system for a fuel cell stack in a vehicle that employs the noise-comfort function is also provided.

6 Claims, 2 Drawing Sheets

NOISE-COMFORT FUNCTION FOR COOLING SYSTEMS WITH PROPORTIONAL VARIABLE SPEED FANS

FIELD OF THE INVENTION

The present disclosure relates to fuel cell systems and more particularly to a system and method for cooling fuel cell systems.

BACKGROUND OF THE INVENTION

Fuel cells have been proposed as a clean, efficient and environmentally responsible power source for electric vehicles and various other applications. In particular, fuel cells have been identified as a potential alternative for the traditional internal-combustion engine used in automobiles.

A fuel cell typically includes three basic components: a cathode, an anode, and an electrolyte membrane. The electrolyte membrane is sandwiched between the cathode and the anode to form a membrane-electrolyte-assembly (MEA). Hydrogen at the anode is converted to positively-charged hydrogen ions. These ions travel through the electrolyte to the cathode, where they react with oxygen. The oxygen can be supplied from air, for example. The remaining electrons in the anode flow through an external circuit to the cathode, where they join the oxygen and the hydrogen protons to form water. Individual fuel cells can be stacked together in series to form a fuel cell stack capable of supplying sufficient amounts of electricity.

Fuel cell stacks are characterized by a specific operating temperature which presents a significant design challenge, particularly with respect to a structural and an operational integrity of the fuel cell stack. Maintaining the fuel cell stack within the temperature ranges that are necessary for optimum fuel cell operation generally requires employment of a cooling system.

The cooling systems known for both internal combustion engines and fuel cell systems typically utilize a radiator having a plurality of channels through which a coolant from a combustion engine or fuel cell stack may flow for cooling. The radiator generally includes an electrically driven fan which is mounted adjacent the radiator channels and employed to reduce a temperature of the coolant as the coolant passes through the radiator. The electrical fans can be variable speed and increase in power proportionally as the temperature of the coolant from the fuel cell stack increases. However, it is known that the electrical fans can emit noise at an unacceptable level, particularly when the electrical fans are high-power or have large rotor diameters. The noise can be undesirable for both passengers in a vehicle employing the cooling system and for pedestrians in proximity of the vehicle.

A fuel cell system having a fan shroud and barrel combination with built-in silencers, e.g. Helmholtz resonators, is reported by Shah et al. in U.S. Pat. No. 6,896,095. The fan shroud can be used to reduce a noise associated with an air-moving device such as an axial flow fan employed in a cooling system.

U.S. Pat. No. 6,651,761 to Hrovat et al. describes a system and method for controlling a coolant temperature of two independent cooling loops of a fuel cell vehicle by adjusting at the system pump speed, fan speed, and radiator bypass valve position. Multiple feedback controllers coordinated by flip-flop logic are used to minimize energy consumption and provide optimal control system performance with respect to fan speed and valve position plant inputs.

There is a continuing need for a fuel cell system and method that provides a desired cooling performance with a minimized noise emission. Desirably, the fuel cell system militates against damaging of the fuel cell system caused by an undesirable operating temperature.

SUMMARY OF THE INVENTION

In concordance with the instant disclosure, a fuel cell system and method that provides a desired cooling performance, minimizes noise emission, and militates against a thermal damage of the fuel cell system is surprisingly discovered.

In one embodiment, a cooling system for a fuel cell stack in a vehicle is provided, including a coolant source in communication with the fuel cell stack. The cooling system includes a variable speed fan. The variable speed fan is adapted to reduce a temperature of a coolant. The cooling system further includes a controller adapted to receive at least one signal and provide a fan command to the variable speed fan. The controller has a noise-comfort function that is used to select the fan command. A speed of the variable speed fan is adjusted in response to the fan command from the controller.

In a further embodiment, a method is disclosed for operating the cooling system for the fuel cell stack in a vehicle. The method includes determining a fan request for a variable speed fan disposed in the cooling system, an employing of a noise-comfort function to select a fan comfort request, and adjusting of a speed of the variable speed fan in response to the fan request, wherein the noise emission by the variable speed fan is militated against.

In another embodiment, the method for operating the cooling system includes determining one or more desired fan requests for the variable speed fan disposed in the cooling system, selecting a maximum fan request from the one or more desired fan requests, employing the noise-comfort function to select the fan comfort request; selecting the fan command from the maximum fan request and the fan comfort request, and adjusting the speed of the variable speed fan in response to the fan command. The noise emission by the variable speed fan is thereby militated against.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
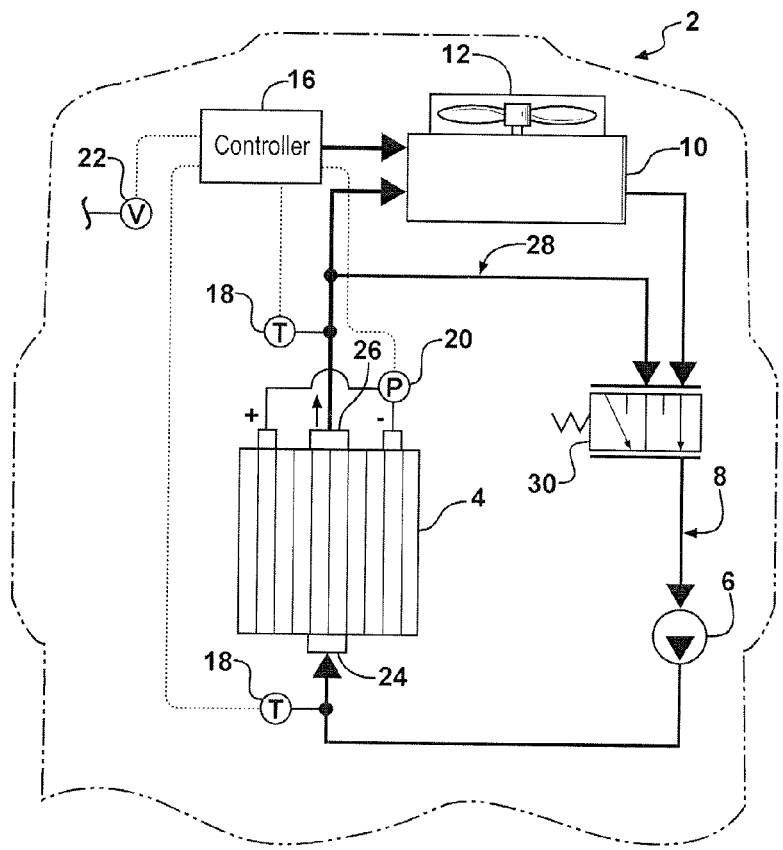
FIG. 1 shows a schematic flow diagram of a cooling system according to an embodiment of the present invention.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

As shown in FIG. 1, the present disclosure includes a cooling system 2 for a fuel cell stack 4. In particular embodiments, the cooling system 2 is included in a vehicle (not shown) powered by the fuel cell stack 4. The cooling system 2 can include one or more pumps 6 that circulate a coolant (not shown) in a conduit 8 and through the fuel cell stack 4.

The cooling system 2 includes a chiller or coolant source 10 in fluid communication with the fuel cell stack 4. Any conventional coolant source can be used as desired. The coolant source 10 is configured to allow the coolant from the fuel cell stack 4 to flow therethrough. The coolant source 10 is further adapted to remove heat from the coolant. The coolant carries the heat from the fuel cell stack 4 which is generated during chemical reactions in the fuel cell stack 4. The coolant source 10 can also be adapted to thermally manage other vehicle components, such as auxiliary fuel cell system components (not shown) an electric drivetrain (not shown), a power electronics controller (not shown), and a vehicle climate controller (not shown), for example. In particular embodiments, the coolant source 10 includes a plurality of conduits (not shown), for example, hoses or piping. The coolant is caused to flow through the plurality of conduits and allowed to undergo a heat exchange, e.g. by a cooling air flow over the plurality of conduits.

The coolant source 10 includes a variable speed fan 12 disposed adjacent to the coolant source 10. The variable speed fan 12 provides a means for removing the heat from the coolant source 10, e.g., by continuously or intermittently creating a flow of air through the coolant source 10. In particular embodiments, the variable speed fan 12 is a high performance fan or a high power fan. It should be appreciated that other types of variable speed fans 12 can be used as desired.

The variable speed fan 12 is adapted to receive a signal from a controller 16. The controller is adapted to receive at least one signal. The controller 16 is in communication with one or more system sensors 18, 20, 22. The one or more system sensors 18, 20, 22 may include, for example, a temperature sensor 18, a power sensor 20, and a velocity sensor 22. One of ordinary skill should understand that additional system sensors may also be used.

As a nonlimiting example, two temperature sensors 18 are shown in communication with a coolant inlet 24 and a coolant outlet 26. A signal from the temperature sensors 18 may be used by the controller 16 to select a desired speed of the fan 12. The power sensor 20 is adapted to measure a power output of the fuel cell stack 4 or a "stack power". The velocity sensor 22 is disposed on the vehicle and adapted to measure a "vehicle speed," e.g. a velocity of an automobile on a highway.

The cooling system 2 may further include a bypass conduit 28 in fluid communication with a coolant inlet 24 and a coolant outlet 26 of the fuel cell stack 4. A bypass conduit 28 is typically in fluid communication with a bypass valve 30. The bypass valve 30 is adapted to direct the coolant from either the coolant source 10 or the bypass conduit 28 as desired. For example, if a temperature of the coolant is in a maximum range, the bypass valve 30 directs a flow of the coolant through the coolant source 10. This reduces the temperature of the coolant to a desired temperature prior to distributing the coolant to the fuel cell stack 4. As a further example, if the temperature of the coolant is in a minimum range, the bypass valve 30 is adapted to direct the flow of the coolant through the bypass conduit 28, thereby maintaining the temperature of the coolant at substantially the same temperature as when the coolant exited the fuel cell stack 4. It should be appreciated that the bypass valve 30 is further adapted to direct the flow of the coolant when desired, e.g., based on a signal from the temperature sensor 18. Any conventional diverter valve can be used for the bypass valve 30.

Figure 2:
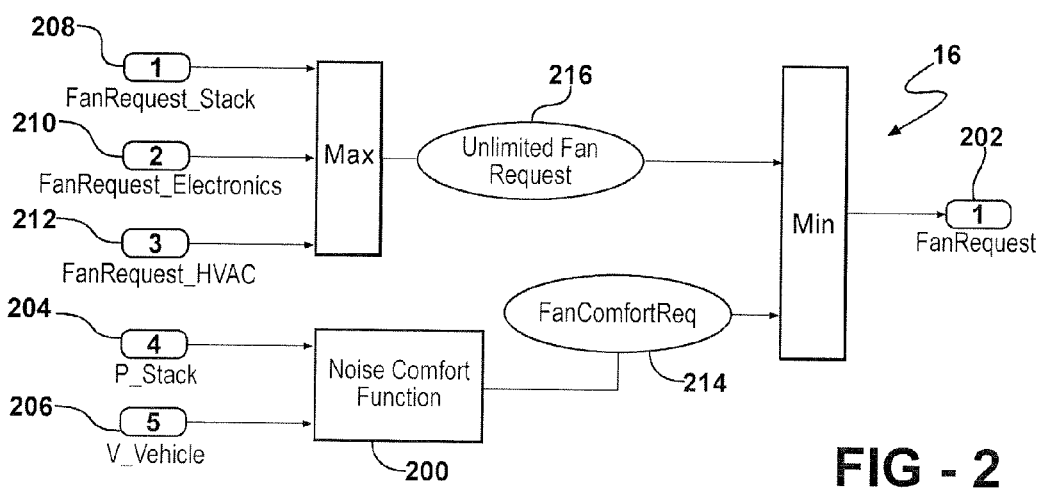
FIG. 2 shows a schematic flow diagram of a controller structure having a noise-comfort function for a cooling system.

As depicted in FIG. 2, the controller 16 includes a noise-comfort function 200 and that generates and sends a fan command 202 (FanRequest) as the signal to the variable speed fan 12. The speed of the variable speed fan 12 is adjusted according to the fan command 202. In one embodiment, the controller 16 receives a signal relating to a stack power 204 (P_Stack) from the power sensor 20 and receives a signal relating to a vehicle velocity 206 (v_Vehicle) from the velocity sensor 22. The controller 16 further receives one or more fan requests including, as non-limiting examples, a fan request 208 from the fuel cell stack 4 (FanRequest_Stack), a fan request 210 from the power electronics controller (FanRequest_Electronics), and a fan request 212 from the vehicle climate controller (FanRequst_HVAC). The one or more fan requests are requests for a speed of the variable speed fan 12. Based on the received fan requests 208, 210, 212, the received signals 204, 206, and the noise-comfort function 200, the controller 16 selects and sends the fan command 202 to the variable speed fan 12. It should be appreciated that a noise emission by the variable speed fan 12 can be militated against by adjusting the speed of the variable speed fan 12 as described herein.

A method for operating the controller 16 of the present invention first includes the step of determining one or more fan requests 208, 210, 212; employing the noise-comfort function to select a fan comfort request 214; adjusting the speed of the variable speed fan 12 in response to the one or more fan requests 208, 210, 212 and the fan comfort request 214. As a nonlimiting example, the step of determining the one or more fan requests 208, 210, 212 can include determining the desired fan request 208 from the fuel cell stack 4, determining the desired fan request 210 for the power electronics controller, and determining the desired fan request 212 for the vehicle climate controller. It should be understood that other fan requests may be determined as desired.

Figure 3:
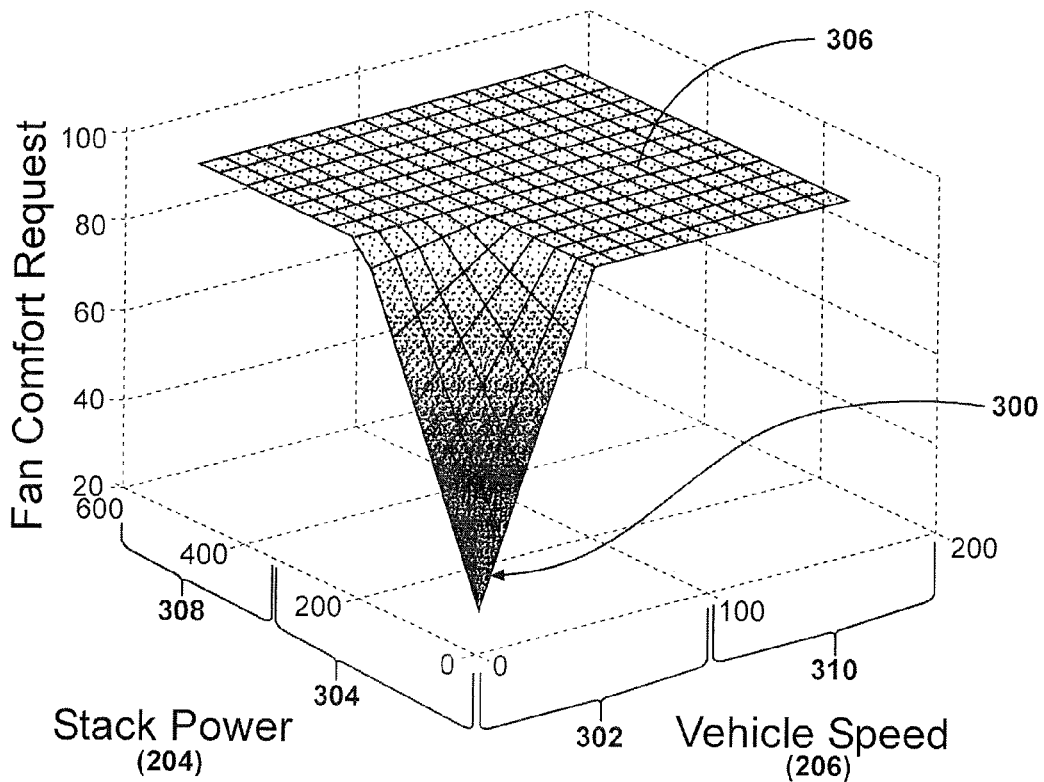
FIG. 3 is a graphical illustration of a noise-comfort function according to an embodiment of the present invention.

It should be further understood that the noise-comfort function 200 employed according to the present disclosure includes one or more algorithms or mathematical models, for example a mathematical model as depicted in FIG. 3. The one or more mathematical models are used to correlate one or more variables to the noise emission of the variable speed fan 12 and to output the fan comfort request 214. The one or more algorithms or mathematical models do not require a substantial amount of memory, and the related calculations can be performed in real-time if desired. One of ordinary skill should appreciate that the noise-comfort function 200 having the one or more algorithms or mathematical models may be employed in any vehicle having a variable speed fan 12 including, e.g., a fuel-cell powered vehicle and an internal combustion engine (ICE) vehicle.

The one or more variables relate to a sensor signal, for example, and provide the fan comfort request 214 as an output. Illustratively, the model of the noise-comfort function 200 includes a look-up table having the fan comfort request 214 as a function of the variables 204, 206. In one particular embodiment, the noise-comfort function 200 includes a linear equation having the fan comfort request 214 as a function of the variables 204, 206. In a further illustrative embodiment, the fan comfort request 214 is selected by the noise-comfort function 200 to optimize both a cooling of the fuel cell stack 4 and the noise emission of the variable speed fan 12.

The fan comfort request 214 typically represents a compromise between a cooling performance and a desirable noise level. For example, the fan comfort request 214 generated by the noise-comfort function 200 may have a higher priority than an unlimited fan request 216 under normal vehicle operation. As a further illustration, the fan command 202 may have a higher priority when the vehicle is parked or operating at a low vehicle speed, wherein the noise emission from the variable speed fan 12 is a dominant noise. However, when the vehicle having the cooling system 2 is undergoing an extreme operation, e.g., an uphill drive or a drive with a load or trailer, the fan command 202 provided by the controller 16 may be controlled by the unlimited fan request. In particular, the unlimited fan request may have the higher priority at a high vehicle speed where a noise relating to an air drag and a tire noise are dominant.

In one embodiment of the present invention, the noise-comfort function correlates the stack power 204 of the fuel cell stack 4, the vehicle speed 206, and a noise emission to select the fan comfort request 214 as the output. As should be understood, the step of employing the noise-comfort function 200 can include a step of measuring the one or more variables. The variables include the stack power 204 and the vehicle speed 206, for example, provided by the power sensor 20 and the velocity sensor 22.

As depicted FIG. 3, the fan comfort request 214 selected by the noise-comfort function 200 is, for example, a minimum value 300 when the vehicle speed 206 is within a minimum range 302 and when the stack power 204 is within a minimum range 304. In certain embodiments, the fan comfort request is a maximum value 306 when the vehicle speed 206 is within a minimum range 302 and when the stack power 204 is within a maximum range 308. Similarly, in particular embodiments the fan comfort request 214 is a maximum value 306 when the vehicle speed 206 is within a maximum range 310 and when the stack power 204 is within a minimum range 304. It should be understood that the fan comfort request 214 selected by the noise-comfort function is correlated to a desired noise emission by the variable speed fan 12, and can further include a variety of intermediate values between the minimum value 300 and the maximum value 306 for the fan comfort request 214.

The step of measuring of the stack power 204 used to calculate the fan comfort request 214 can include, for example, a measuring of a stack temperature. Illustratively, the measuring of the stack temperature is performed with the one or more temperature sensors 18. One or ordinary skill should appreciate that a heat loss as measured by a change in the stack temperature can be correlated with the stack power 204. For example, a heat loss may be used to calculate an overall resistance of the fuel cell stack 4, which may further be used to calculate the stack power 204. In one particular embodiment, the stack power 204 is determined by measuring a current and a voltage of the fuel cell stack 4. The current and the voltage can be correlated to a stack power 204. Alternative means for measuring the stack power 204 can be selected as desired.

Figure 4:
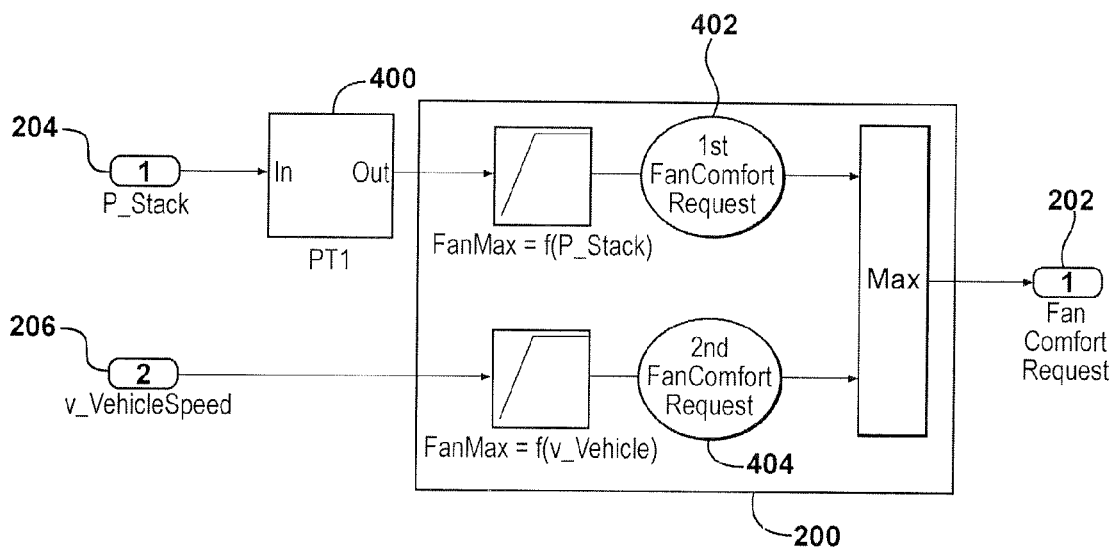
FIG. 4 is a schematic flow diagram of the controller structure and noise-comfort function depicted in FIG. 2.

As shown in FIG. 4, the stack power 204 measurement can be processed through a filter 400. In particular embodiments, the filter 400 is a first order filter (PT1). Typically, due a large quantity of noise associated with the stack power 204 measurements, and also a high dynamic of the measurement signal, a filtering of the stack power 204 measurement is desirable. The filtering is typically performed prior to providing the stack power 204 and the vehicle speed 206 to the noise-comfort function 200.

Illustratively, the stack power 204 is filtered and fed to the noise-comfort function 200 along with the vehicle speed 206. In a particular embodiment, the employing of the noise-comfort function 200 includes the steps of correlating the stack power 204 to a first fan comfort request 402, and correlating the vehicle speed 206 to a second fan comfort request 404. The correlations are performed, for example, by employing the algorithms or models as described herein. The fan comfort request 214 can then be selected of the first fan comfort request 402 and the second fan comfort request 404. In one embodiment, the fan comfort request 214 is selected as the greater of the first fan comfort request 402 and the second fan comfort request 404.

The method of the present disclosure further includes adjusting the speed of the variable speed fan 12 in response to the one or more fan requests 208, 210, 212. As a nonlimiting example, the variable speed fan 12 may be a proportional variable speed fan having a speed that is accurately controlled with a pulse width modulation (PWM) signal. Thus, the controller 16 can provide the fan command 202 comprising a PWM signal that may be used to adjust the speed of the variable speed fan 12. It should be understood that other means for adjusting the speed of the variable speed fan 12 can be used as desired.

With renewed reference to FIG. 2, the step of limiting the speed of the variable speed fan 12 can include comparing the fan comfort request 214 that was determined according to the noise-comfort function 200 against the unlimited fan request 216. For example, the fan comfort request 214 can overlay the unlimited fan request 216. The unlimited fan request 216 may be selected as a maximum of the one or more fan requests, e.g. the fan requests 208, 210, 212. The fan command 202 may be selected as a minimum of the unlimited fan request 216 and the fan comfort request 214. One of ordinary skill in the art should appreciate that when a value of the fan comfort request 214 is less than a value of the unlimited fan request 216, the speed of the variable speed fan 12 is thereby limited. Since the speed of the variable speed fan 12 is less than it would be if dictated by the unlimited fan request 216, the noise emission generated by the variable speed fan 12 is optimized. Thus, the fan command 202 can be selected to optimize a cooling of the fuel cell stack 4 and the noise emission by the variable speed fan 12 of the cooling system 2.

It should be appreciated that the cooling system 2 and the method of the present invention increase a noise comfort of a vehicle occupant or pedestrian in proximity of a vehicle having the cooling system 2. In particular, the fan noise emission is controlled and limited by the noise-comfort function 200 in relation to the operating conditions of the vehicle and the fuel cell stack 4 powering the vehicle. Thermal damage to the fuel cell stack 4 is militated against by the controller 16 selection of the fan command 202 in relation to the stack power 204 and vehicle speed 206 requirements. Furthermore, it should be appreciated that the cooling system 2 of the present invention is a simplified design that does not require additional hardware and cooling system components to be effective.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling system for a fuel cell stack in a vehicle, the cooling system comprising:
a coolant source in fluid communication with the fuel cell stack,
a variable speed fan adapted to reduce a temperature of a coolant;

at least one power sensor adapted to measure a power output of the fuel cell stack and generate a power output signal; and at least one velocity sensor adapted to measure a speed of the vehicle and generate a vehicle speed signal; and a controller having a noise comfort function that selects a fan comfort request based on the power output signal and the vehicle speed signal, the fan comfort request representing a compromise between the temperature of the coolant and a noise emission by the variable speed fan, wherein the controller is in communication with the at least one power sensor and the at least one velocity sensor, the controller adapted to receive the power output signal from the at least one power sensor and the vehicle speed signal from the at least one velocity sensor, wherein the controller is in communication with at least one of the fuel cell stack, a power electronics controller, and a vehicle climate controller, and receives at least one fan request signal from at least one of the fuel cell stack, the power electronics controller, and the vehicle climate controller;

wherein the controller compares the fan comfort request and the at least one fan request and limits the speed of the variable speed fan by generating a fan command to the variable speed fan in response to one of the fan request and the fan comfort request, wherein the noise emission by the variable speed fan is militated against.

2. The cooling system of claim 1, further comprising:
a bypass conduit in communication with the fuel cell stack; and
a coolant valve adapted to provide the coolant to one of the coolant source and the bypass conduit as desired.

3. The cooling system of claim 1, wherein the variable speed fan is a high performance fan.

4. The cooling system of claim 1, wherein the controller is configured to select an unlimited fan request from the at least one fan request signal, the unlimited fan request being a maximum of the at least one fan request signal, and wherein the controller is further configured to select as the fan command a minimum of the unlimited fan request and the fan comfort request, whereby the noise emission generated by the variable speed fan is limited.

5. The cooling system of claim 4, wherein the fan command is selected by the noise comfort function of the controller to optimize a cooling of the fuel cell stack and the noise emission by the variable speed fan, the noise comfort function including a mathematical model that correlates the power output signal, the vehicle speed signal, and the fan noise emission to select the fan comfort request.

6. The cooling system of claim 5, wherein the mathematical model includes at least one of a look-up table having the fan comfort request as a function of the power output signal and the vehicle speed signal, and a linear equation having the fan comfort request as a function of the power output signal and the vehicle speed signal.

* * * * *